United States Patent [19]
Khinkis et al.

[11] Patent Number: 5,476,375
[45] Date of Patent: Dec. 19, 1995

[54] STAGED COMBUSTION IN A POROUS-MATRIX SURFACE COMBUSTOR TO PROMOTE ULTRA-LOW $NO_x$ EMISSIONS

[75] Inventors: Mark J. Khinkis, Morton Grove; Hamid A. Abbasi, Darien, both of Ill.; Thomas D. Briselden, Lakewood, Ohio

[73] Assignee: Institute of Gas Technology, Des Plaines, Ill.

[21] Appl. No.: 327,273

[22] Filed: Oct. 21, 1994

Related U.S. Application Data

[63] Continuation-in-part of Ser. No. 90,339, Jul. 12, 1993, Pat. No. 5,375,563.

[51] Int. Cl.⁶ .................................. F23C 7/00; F22B 1/00
[52] U.S. Cl. ............................. 431/7; 431/170; 122/40; 122/14; 122/18; 122/19; 122/367.4
[58] Field of Search .................... 431/7, 170; 122/14, 122/18, 19, 367.4

[56] References Cited

U.S. PATENT DOCUMENTS

| | | | |
|---|---|---|---|
| 1,331,022 | 2/1920 | Mathy | 431/328 |
| 3,188,366 | 6/1965 | Flynn | 432/9 |
| 3,645,237 | 2/1972 | Seth | 122/4 D |
| 3,738,793 | 6/1973 | Reid et al. | 431/328 |
| 3,833,338 | 9/1974 | Badrock | 431/328 |
| 3,877,441 | 4/1975 | Mitch et al. | 122/367.4 |
| 3,921,712 | 11/1975 | Renzi | 122/367.4 X |
| 4,309,309 | 1/1982 | Blanton, Jr. | 208/113 |
| 4,354,823 | 10/1982 | Buehl et al. | 431/328 |
| 4,418,650 | 12/1983 | Johnson et al. | 122/4 D |
| 4,499,944 | 2/1985 | Komakine | 122/4 D X |
| 4,597,734 | 7/1986 | McCausland et al. | 431/328 |
| 4,605,369 | 8/1986 | Buehl | 431/328 |
| 4,646,637 | 3/1987 | Cloots | 122/4 D X |
| 4,666,400 | 5/1987 | Vigneau | 431/328 |
| 4,673,349 | 6/1987 | Abe et al. | 431/328 |
| 4,730,599 | 3/1988 | Kendall et al. | 431/7 |
| 4,779,574 | 10/1988 | Nilsson et al. | 122/4 D X |
| 4,865,122 | 9/1989 | Brown | 122/4 D X |
| 4,899,695 | 2/1990 | Brian et al. | 122/4 D X |
| 4,953,512 | 9/1990 | Italiano | 122/4 D |
| 4,966,101 | 10/1990 | Maeda et al. | 122/4 D X |
| 4,985,133 | 1/1991 | Sapre | 208/113 X |
| 5,014,652 | 5/1991 | Hyldgaard | 122/4 D X |
| 5,026,269 | 6/1991 | Ruottu | 122/4 D X |
| 5,054,436 | 10/1991 | Dietz | 122/4 D |
| 5,080,577 | 1/1992 | Bell et al. | 431/7 |
| 5,160,254 | 11/1992 | Bell et al. | 431/7 |
| 5,233,825 | 8/1993 | Shekleton | 60/39.36 |
| 5,288,397 | 2/1994 | Markham et al. | 208/113 |
| 5,308,473 | 5/1994 | Markham et al. | 208/113 |

FOREIGN PATENT DOCUMENTS 1393994  5/1988  U.S.S.R. .

Primary Examiner—Larry Jones
Attorney, Agent, or Firm—Speckman, Pauley & Fejer

[57] ABSTRACT

A porous matrix, surface combustor-fluid heating apparatus in which combustion of a fuel/oxidant mixture is carried out in stages within a stationary porous bed disposed in a combustion chamber. A fuel-rich fuel/oxidant mixture is burned within a region of the stationary porous bed disposed near the inlet end of the combustion chamber, forming a primary combustion zone. A secondary oxidant is introduced into the stationary porous bed downstream of the primary combustion zone forming a secondary combustion zone. Finally, heat resulting from the combustion is removed by fluid flowing through heat exchanger tubes embedded within the stationary porous bed.

20 Claims, 1 Drawing Sheet

STAGED COMBUSTION IN A POROUS-MATRIX SURFACE COMBUSTOR TO PROMOTE ULTRA-LOW $NO_x$ EMISSIONS

CROSS-REFERENCE TO RELATED PATENT APPLICATION

This application is a continuation-in-part application of our application having Ser. No. 08/090,339, filed 12 July 1993, now U.S. Pat. No. 5,375,563, issued on Dec. 27, 1994.

BACKGROUND OF THE INVENTION

1. Field of the Invention

This invention relates to a process and apparatus for combustion in a surface combustor-fluid heater in which the combustion is carried out in stages within the pores of the stationary porous bed and heat transfer is achieved using heat exchange surfaces embedded in the stationary porous bed resulting in very high combustion intensity, very high heat transfer rates, improved energy utilization efficiency, ultra-low combustion emissions, and lower capital and operating costs. The use of staged combustion within a porous matrix surface combustor-heater in accordance with this invention reduces $NO_x$ formation by the combustion process to levels less than about 10 vppm.

2. Description of Prior Art

In general, heat energy may be transmitted by conduction, convection and/or radiation. Heat transmission by radiation and utilization of infrared energy has many advantages over conventional heat transmission by convection and conduction. The operation and construction of infrared burners and radiant heaters is relatively simple and, thus, more economical than other types of heat generation means. The intensity of radiant heat may be precisely controlled for greater efficiency and infrared energy may be focused, reflected, or polarized in accordance with the laws of optics. In addition, radiant heat is not ordinarily affected by air currents. One type of gas-fired infrared generator currently available is a surface combustion infrared burner having a radiating burner surface comprising a porous refractory. The combustion mixture is conveyed through the porous refractory and burns above the surface to heat the surface by conduction. One such burner is taught by U.S. Pat. No. 1,331,022. Other surface combustors are taught by U.S. Pat. Nos. 4,666,400; 4,605,369; 4,354,823; 3,188,366; 4,673,349; 3,833,338; and 4,597,734. See also U.S. Pat. No. 3,738,793 which teaches an illumination burner having a layered porous structure, the layered pores maintaining a stable flame in a thoria-ceria illumination burner in which combustion occurs not within the pores of the combustor, but rather on the surface of the top layer.

Control of combustion emissions, in particular $NO_x$ emissions, is an important requirement for surface combustors which are generally known to produce high combustion intensity and, thus, high combustion temperatures. It is generally known that to reduce $NO_x$ formation within the combustion process, it is necessary to simultaneously remove heat from the combustion process as combustion of the fuel occurs. U.S. Pat. No. 5,014,652 teaches a fluidized bed combustion reactor/fluidized bed cooler comprising a vertical reactor chamber designed to contain two separate fluidized beds, one of which contains cooling coils through which a cooling fluid is flowing to remove heat from the bed. U.S. Pat. No. 3,645,237 teaches a fluidized bed water heater in which water is heated or steam is produced by passing water through heating coils embedded in the fluidized bed. Similarly, U.S. Pat. No. 4,499,944, U.S. Pat. No. 4,779,574, and U.S. Pat. No. 4,646,637 teach a heat exchanger installed in a fluidized bed. And, U.S. Pat. No. 4,899,695 teaches a fluidized bed combustion reaction in which heat is transferred from the fluidized bed to water-containing tubes surrounding the reactor.

An alternative to control of $NO_x$ emissions by removal of heat from the combustion process as combustion of the fuel occurs is the use of staged combustion in which the fuel and/or oxidant are introduced into the combustion chamber in stages and under conditions which maintained the combustion temperature generally below the temperature required for substantial $NO_x$ formation. U.S. Pat. No. 5,080,577 and U.S. Pat. No. 5,160,254 both teach staged combustion within a porous matrix combustor. The '577 patent teaches a method and apparatus for low $NO_x$ combustion in which fuel and an oxidant mixture is burned in a first combustion zone under fuel-rich conditions and in a second combustion zone under fuel-lean conditions. The '254 patent teaches a porous matrix combustor with primary and secondary combustion zones, the primary combustion zone being fuel-lean and the secondary combustion zone being fuel-rich. To provide the desired fuel-rich conditions in the secondary combustion zone, fuel and oxidant are both injected into the porous matrix downstream of the primary combustion zone. See also Russian Patent SU 1393994.

U.S. Pat. No. 5,308,473 teaches a low $NO_x$ fluidized catalytic cracking regeneration process and apparatus which utilizes dilute phase afterburning to superheat catalyst entrained in the dilute phase region above the fluidized bed. Similarly, U.S. Pat. No. 5,288,397 teaches a process and apparatus for dense phase, at least partially co-current, fluidized bed regeneration of a fluidized catalytic cracker catalyst.

One problem associated with fluidized bed combustors is the amount of particulate matter generated by such beds which is carried out with the products of combustion exhausted by the combustor. In addition, the abrasiveness of the fluidized bed particles against the outer surfaces of heat exchangers disposed in the fluidized bed causes erosion of the heat exchanger surfaces. Finally, pressure drop of flow through the fluidized bed is high due to the high flow of velocity required for fluidization.

SUMMARY OF THE INVENTION

It is an object of this invention to provide a process and apparatus for gas fired combustion and fluid heating which produces ultra-low combustion emissions.

It is another object of this invention to provide a process and apparatus for gas fired combustion and fluid heating having higher combustion intensity, high heat transfer rates, and, thus, higher energy utilization efficiency than known gas fired combustion and fluid heating devices.

$NO_x$ emissions are generally known to be the result of the formation of thermal $NO_x$, that is, $NO_x$ which is formed from the high temperature reactions of $N_2$ and $O_2$ in hydrocarbon flames, and prompt $NO_x$, the formation of which is absolutely dependent on the presence of hydrocarbons while being relatively independent of temperature, fuel type, mixture ratio, and residence time. For example, CO and $H_2$ flames yield no prompt $NO_x$ emissions.

Accordingly, it is an object of this invention to provide a process and apparatus for combustion of a fuel which reduces not only the level of thermal $NO_x$ formed in the combustion process, but also reduces the formation of prompt $NO_x$ emissions, compared to known combustion processes, thereby resulting in overall $NO_x$ levels below about 10 vppm.

These and other objects of this invention are achieved by a porous matrix, surface combustor-fluid heating apparatus comprising at least one combustor chamber wall forming a combustion chamber having an inlet end and an outlet end, a flow distributor approximately at the inlet end of the combustion chamber, a stationary porous bed disposed between the flow distributor and the outlet end of the combustion chamber, porous bed heat exchanger means embedded in the stationary porous bed, fuel/oxidant mixture means for introducing a mixture of a fuel and a primary oxidant into the stationary porous bed, and secondary oxidant means for introducing a secondary oxidant into the stationary porous bed.

The porous matrix, surface combustor-fluid heating apparatus in accordance with this invention is a combustion-heat transfer device that is based on the concept of stabilizing a combustion process and removing energy from a porous matrix within the same control volume. A fuel and oxidant mixture is distributed into the porous matrix by means of a flow distributor. In accordance with one embodiment of this invention, the flow distributor is a cooled grid. Energy from the combustion zone is radiated and conducted throughout the porous matrix, including into a preheat zone disposed in a region of the stationary porous bed adjacent to and downstream of the flow distributor. As the fuel and oxidant mixture flows through the preheat zone, the mixture is preheated to its ignition temperature, primarily by means of convected heat transfer from the porous matrix bodies. Due to the high turbulence levels created by the porous matrix bodies, rapid oxidation of the fuel occurs within the combustion zone. Energy from the combustion process is convected and conducted to the porous matrix bodies and to lower heat exchanger tubes disposed in the lower portion of the porous matrix bed. In addition, energy is radiated from the porous matrix bodies to these lower heat exchanger tubes, which rapidly remove the energy by means of a fluid flowing therethrough.

Energy is also radiated and conducted from the porous matrix bodies in the combustion zone to the porous matrix bodies in an upper heat removal zone disposed in the upper portion of the stationary porous matrix bed. This energy, combined with convective energy from the products of complete combustion, transfers energy to upper heat exchanger tubes disposed in the upper heat removal zone, which upper heat exchanger tubes rapidly remove additional energy from the stationary porous bed by means of a fluid flowing therethrough.

Part of the uniqueness of the surface combustor-fluid heating apparatus of this invention is the high heat transfer surface areas produced by the porous matrix bodies which increases heat removal rates by means of enhanced convective and radiant heat transfer, thereby reducing overall flame temperatures, which reduces the formation of thermal $NO_x$ and increases fluid tube heat fluxes which, by means of enhanced convective and radiant heat transfer, reduces the size of the heat exchanger tubes required and improves overall thermal efficiency. In addition, turbulent flow is produced by the porous matrix bodies further increasing heat removal rates by means of enhanced convective heat transfer which reduces overall flame temperatures and, thus, the formation of thermal $NO_x$, further increasing fluid tube heat fluxes by means of enhanced convective and radiative heat transfer which reduces the size of the heat exchanger tubes required and improves overall thermal efficiency, improving combustion intensity thereby concentrating heat release from the combustion process, producing homogeneous combustion which reduces peak flame temperatures which, in turn, reduces the formation of thermal $NO_x$, and increasing combustion efficiency which results in low levels of unburned CO and hydrocarbons.

Experimental, theoretical, and numerical data have shown the products of complete combustion from the porous matrix, surface combustor-fluid heating apparatus of this invention without the use of staged combustion to contain $NO_x$ levels below about 15 vppm and CO levels below about 35 vppm (corrected to 3% $O_2$) and unburned hydrocarbons at less than 5 vppm (corrected to 3% $O_2$). In addition, heat exchanger tube fluxes exceeding 90,000 Btu/hr-ft$^2$ have been demonstrated.

Introduction of the oxidant for combustion of the fuel in stages into the porous matrix, surface combustor-fluid heating apparatus in accordance with the process and apparatus of this invention will produce $NO_x$ levels below 10 vppm (corrected to 3% $O_2$).

The process for combustion of a gaseous fuel in accordance with one embodiment of this invention comprises introducing a fuel-rich fuel/oxidant mixture into the inlet end of a combustion chamber in which is disposed a stationary porous bed. The fuel-rich fuel/oxidant mixture is burned within the stationary porous bed to form a primary combustion zone therein. A secondary oxidant is introduced into the stationary porous bed downstream of the primary combustion zone, forming a secondary combustion zone. Finally, heat resulting from the combustion is removed from the combustion chamber.

BRIEF DESCRIPTION OF THE DRAWINGS

The above-mentioned and other features and objects of this invention will be better understood from the following detailed description taken in conjunction with the drawings, wherein.

DESCRIPTION OF PREFERRED EMBODIMENTS

Figure 1:
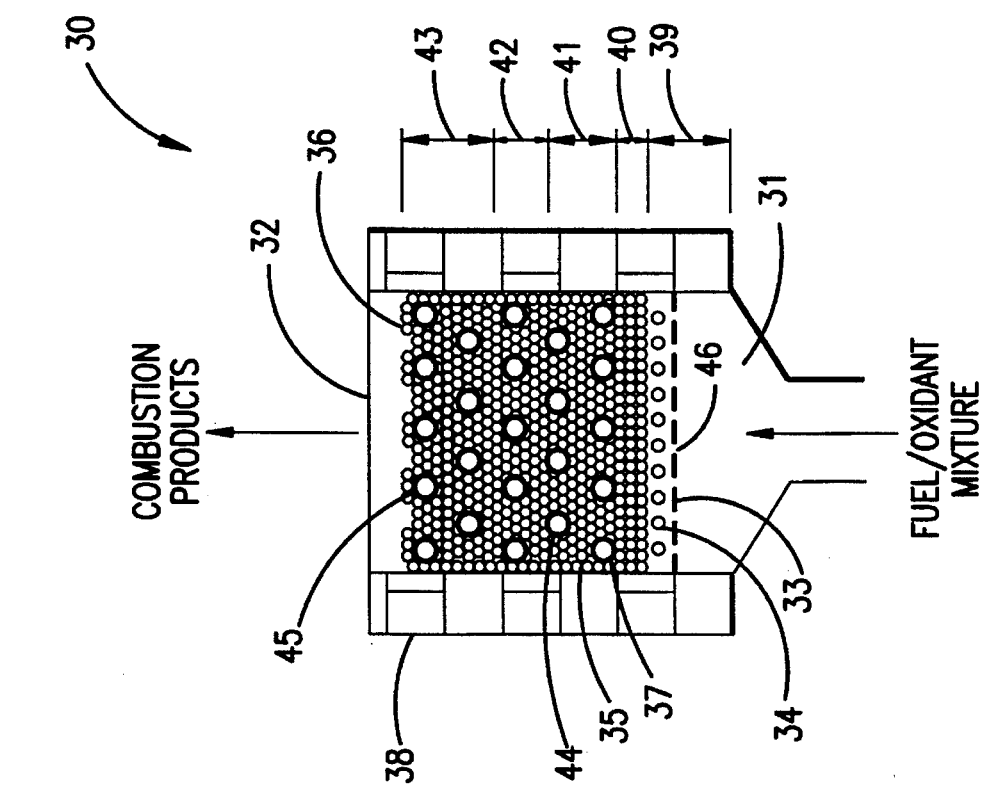
FIG. 1 is a schematic diagram of a gas fired, porous matrix, surface combustor-fluid heater employing single stage combustion.

FIG. 1 shows one embodiment of a porous matrix, surface combustor-fluid heater 10 comprising at least one wall 18 which forms a combustion chamber into which a fuel/oxidant mixture, preferably comprising natural gas and any gas or gaseous mixture comprising oxygen, including air, oxygen, flue gases, nitrogen, steam, etc., is introduced into inlet end 11 and distributed within stationary porous bed 15 disposed in the combustion chamber by flow distributor 13, disposed in a distributor zone defined by arrows 14, comprising flow distributor cooling tubes 14 through which a cooling fluid is circulated to cool flow distributor 13. Stationary porous bed 15 comprises a plurality of high temperature ceramic particles 16. Energy from the combustion zone defined by arrows 21 is radiated and conducted throughout stationary porous bed 15 including into a preheat zone defined by arrows 20 disposed in stationary porous bed 15 in the region adjacent flow distributor 13. As the fuel/ oxidant mixture flows through preheat zone 20, the mixture is preheated to its ignition temperature primarily due to convective heat transfer from high temperature ceramic particles 16 comprising stationary porous bed 15. As a result of high turbulence levels created by high temperature ceramic particles 16 in stationary porous bed 15, rapid oxidation of the fuel occurs within combustion zone 21. Energy from the combustion process is convected and conducted to high temperature ceramic particles 16 and lower heat exchanger tubes 17 disposed within a lower region of stationary porous bed 15. In addition, energy from high temperature ceramic particles 16 is also radiated to lower heat exchanger tubes 17. Lower heat exchanger tubes 17 disposed in the lower portion of stationary porous bed 15 rapidly remove heat from stationary porous bed 15 by means of a cooling fluid, preferably water, flowing therethrough.

Energy is also radiated and conducted from high temperature ceramic particles 16 in combustion zone 21 to high temperature ceramic particles 16 disposed in the upper heat removal zone, defined by arrows 22, disposed in stationary porous bed 15 towards outlet end 12 of combustor 10. This energy, combined with convective energy from the products of complete combustion, is transferred to upper heat exchanger tubes 23 disposed within stationary porous bed 15 in the region corresponding to upper heat removal zone 22. This, in turn, results in rapid removal of additional energy by a cooling fluid, preferably water, flowing through said upper heat exchanger tubes 23.

Figure 2:
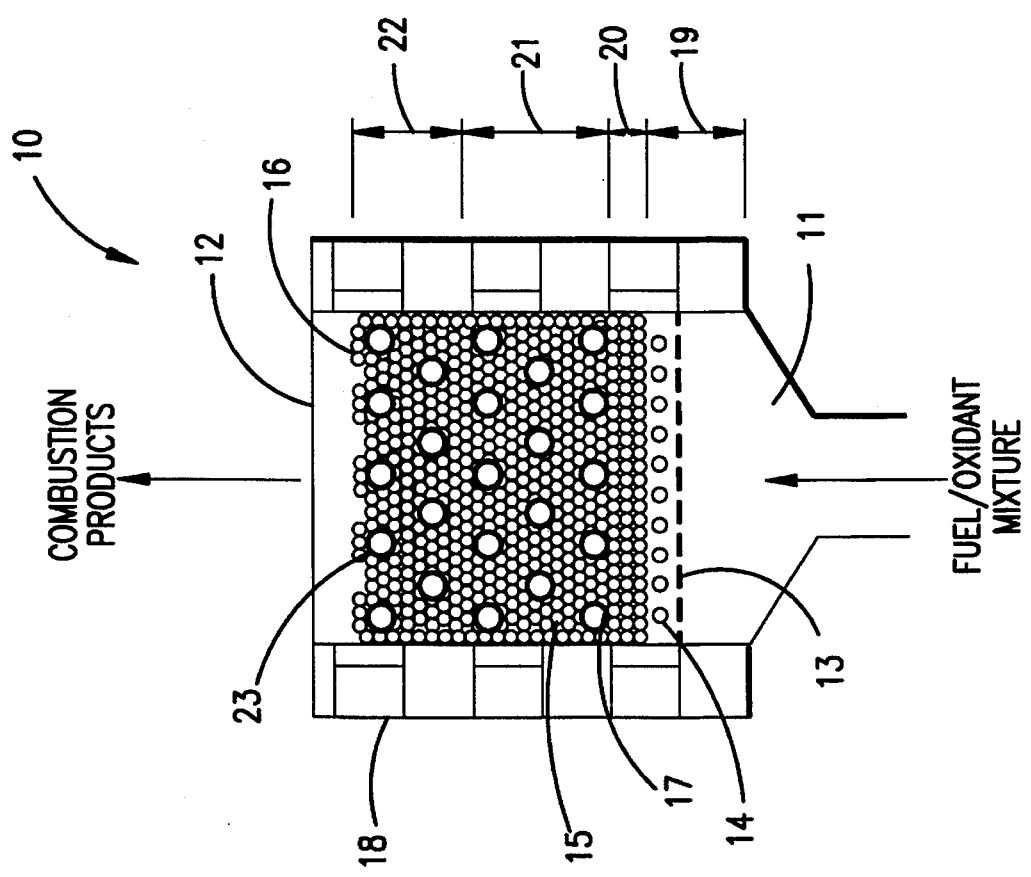
FIG. 2 is a schematic diagram of a gas fired, porous matrix, surface combustor-fluid heater employing staged combustion in accordance with one embodiment of this invention.

A two-stage porous matrix, surface combustor-fluid heater in accordance with one embodiment of this invention is shown in FIG. 2. Two-stage porous matrix, surface combustor-fluid heater 30 comprises at least one combustion chamber wall 38 forming a combustion chamber having inlet end 31 and outlet end 32. Flow distributor 33 is disposed proximate inlet end 31 of the combustion chamber. Stationary porous bed 35 is disposed between flow distributor 33 and outlet end 32 of the combustion chamber. In accordance with a particularly preferred embodiment of this invention, stationary porous bed 35 is supported on flow distributor 33.

Disposed within stationary porous bed 35 are porous bed heat exchanger means comprising at least one fluid-cooled heat exchanger tube 37 through which a cooling fluid is flowing.

To provide the desired heat exchange between stationary porous bed 35 and said at least one fluid-cooled heat exchanger tube 37 disposed in stationary porous bed 35, it is preferred that the outside diameter of said at least one fluid-cooled heat exchanger tube 37 be in the range of about 0.5 inches to about 3.0 inches. In accordance with one preferred embodiment comprising a plurality of fluid-cooled heat exchanger tubes 37, the ratio of tube spacing within stationary porous bed 35 (horizontally and vertically), to the diameter of fluid-cooled heat exchanger tubes 37 is between about 1.0 to about 3.0.

Stationary porous bed 35 comprises a plurality of high temperature ceramic particles 36, preferably selected from the group consisting of alumina, silicon carbide, silica, zirconia, and mixtures thereof. In accordance with a preferred embodiment of this invention, the mean diameter of high temperature ceramic particles 36 is between about 0.1 and about 3.0 inches in order to provide the requisite heat transfer and turbulent flow conditions within stationary porous bed 35.

Flow distributor 33, in accordance with one embodiment of this invention, comprises a wall having a plurality of openings 46 through which the fuel/oxidant mixture flows into stationary porous bed 35. To provide cooling to flow distributor 33, at least one flow distributor cooling tube 34 is disposed within flow distributor 33. In a particularly preferred embodiment of this invention, cooled flow distributor 33 is in the form of a membrane wall.

To provide staging of the combustion air utilized for combustion of the fuel, porous matrix, surface combustor-fluid heating apparatus 30 further comprises fuel/oxidant mixture means for introducing a mixture of a fuel and a primary oxidant into stationary porous bed 35 and secondary oxidant means for introducing a secondary oxidant into stationary porous bed 35. In accordance with one embodiment of this invention, said fuel/oxidant mixture means comprises fluid-cooled flow distributor 33. Said secondary oxidant means for introducing a secondary oxidant into stationary porous bed 35, in accordance with a preferred embodiment of this invention, comprises at least one secondary oxidant injection tube 44 disposed within stationary porous bed 35 downstream of the primary combustion zone defined by arrows 41.

As previously discussed, said porous bed heat exchanger means comprises at least one fluid-cooled heat exchanger tube 37 disposed in stationary porous bed 35. In accordance with a particularly preferred embodiment, said at least one fluid-cooled heat exchanger tube 37 is disposed in the lower portion of stationary porous bed 35 at least about 1 inch to about 4 inches from flow distributor 33.

The process for staged combustion in porous matrix, surface combustor-fluid heating apparatus 30 as shown in FIG. 2 comprises introducing a fuel-rich, fuel/oxidant mixture into inlet end 31 of a combustion chamber in which is disposed stationary porous bed 35. In accordance with one embodiment of this invention, the fuel is natural gas and the natural gas/oxidant mixture has a stoichiometric ratio between 0.5 and about 1.0. Said mixture is distributed in stationary porous bed 35 by means of flow distributor 33, cooled by a cooling fluid flowing through flow distributor cooling tubes 34 disposed within flow distributor 33. From the distribution zone, defined by arrows 39, of two-stage, porous matrix, surface combustor-fluid heating apparatus 30, the fuel-rich, fuel/oxidant mixture is preheated in a preheat zone, defined by arrows 40, disposed within stationary porous bed 35 immediately downstream of distribution zone 39. From preheat zone 40, the fuel-rich, fuel/oxidant mixture flows into the primary combustion zone defined by arrows 41 immediately downstream of preheat zone 40. Energy from the primary combustion zone 41 is radiated and conducted through stationary porous bed 35 including into preheat zone 40. Thus, the mixture of fuel and oxidant is preheated in preheat zone 40 to its ignition temperature by convective and radiative heat transfer from high temperature ceramic particles 36 of stationary porous bed 35. Due to the high turbulence levels created by high temperature ceramic particles 36, rapid partial oxidation of the fuel occurs within the primary combustion zone 41. Products of incomplete combustion are produced in primary combustion zone 41 having high levels of $H_2$, CO, and $N_2$. Extremely low levels of $NO_x$ and total unburned hydrocarbons are produced in primary combustion zone 41.

Energy from the combustion process in primary combustion zone 41 is convected and conducted to lower fluid-cooled heat exchanger tubes 37 disposed in the lower portion of stationary porous bed 35. In addition, energy is radiated from high temperature ceramic particles 36 to lower fluid-cooled heat exchanger tubes 37. Lower fluid-cooled heat exchanger tubes 37 rapidly remove heat by means of a cooling fluid, for example water, flowing therethrough. Secondary oxidant is then injected into a secondary oxidant injection zone defined by arrows 42 in stationary porous bed 35 disposed adjacent to and downstream of primary combustion zone 41. Secondary oxidant is injected into secondary oxidant injection zone 42 through secondary oxidant injection tubes 44 disposed within secondary oxidant injection zone 42 of stationary porous bed 35. The high turbulence levels created by high temperature ceramic particles 36 within stationary porous bed 35 enhance mixing of the secondary oxidant with the products of incomplete combustion from primary combustion zone 41, forming a secondary combustion zone defined by arrows 43 in stationary porous bed 35 disposed immediately downstream of secondary oxidant injection zone 42. The combustion efficiency of the products of incomplete combustion and secondary oxidant is, therefore, enhanced. In accordance with a preferred embodiment of the process of this invention, the amount of secondary oxidant introduced into secondary oxidant injection zone 42 is sufficient to complete combustion of the products of incomplete combustion from primary combustion zone 41.

To maintain the flame temperature within stationary porous bed 35 below the temperature required for formation of thermal $NO_x$, the heat generated by completion of the combustion reaction in secondary combustion zone 43 is rapidly removed by upper fluid-cooled heat exchanger tubes 45 disposed in secondary combustion zone 43 of stationary porous bed 35. Because a significant amount of energy, about 10% to 30%, is removed from primary combustion zone 41 through lower fluid-cooled heat exchanger tubes 37 disposed in primary combustion zone 41, the flame temperature in upper fluid-cooled combustion zone 43, upon completion of combustion and additional rapid heat removal through upper fluid-cooled heat exchanger tubes 45 will be reduced significantly below 2800° F. Thus, the formation of thermal $NO_x$ is reduced. In addition, formation of prompt $NO_x$ is also reduced due to the presence of very low levels of unburned hydrocarbons in the products of combustion from primary combustion zone 41. By reducing the formation of $NO_x$ in primary combustion zone 41 and thermal and prompt $NO_x$ in secondary combustion zone 43, total $NO_x$ levels from two-stage, porous matrix, surface combustor-fluid heating apparatus 30 can be less than 10 vppm.

Experimental and theoretical data both indicate that low $NO_x$, less than 1.0 vppm at 3% $O_2$, will be produced in the first stage of the two-stage porous matrix-surface combustor fluid heating apparatus 30 in accordance with this invention, and less than 10 vppm of $NO_x$ is produced after complete combustion in the second stage. Levels of CO and total unburned hydrocarbons are accordingly less than 20 vppm and 5 vppm, respectively. In addition, heat exchanger tube fluxes exceeding 90,000 Btu/hr-ft$^2$ have been demonstrated.

While staged combustion with heat removal for $NO_x$ reduction in industrial processes is known, the two-stage porous matrix surface-combustor fluid heating apparatus and process for combustion of a fuel therein in accordance with this invention are unique in that high heat transfer surface areas are produced by high temperature ceramic particles 36 comprising stationary porous bed 35 in both primary combustion zone 41 and secondary combustion zone 43. This, in turn, increases heat removal rates by means of enhanced radiant heat transfer which, in primary combustion zone 41, reduces the overall flame temperatures which reduces the formation of thermal $NO_x$ therein, and in secondary combustion zone 43, further reduces the overall flame temperature, which further reduces the formation of thermal $NO_x$. In addition, fluid tube heat fluxes associated with lower fluid-cooled heat exchanger tubes 37 and upper fluid-cooled heat exchanger tubes 45 in primary combustion zone 41 and secondary combustion zone 43, respectively, are increased by means of enhanced convective and radiant heat transfer, thereby enabling reduction in the size of tubes required and resulting in improvement of overall thermal efficiency.

In addition, the turbulent flow produced by high temperature ceramic particles 36 in both the primary combustion zone 41 and secondary combustion zone 43, in addition to increasing heat removal rates and increasing fluid tube heat fluxes by means of enhanced convective heat transfer, also improves combustion intensity, thereby concentrating heat release from the combustion process in both the primary combustion zone 41 and secondary combustion zone 43. The turbulent flow produced by high temperature ceramic particles 36 in stationary porous bed 35 further results in homogeneous combustion which reduces peak flame temperatures and the formation of pockets of high $O_2$ concentrations, thereby reducing the formation of thermal $NO_x$ in both primary combustion zone 41 and secondary combustion zone 43. The turbulent flow produces efficient conversion of substoichiometric oxidant and fuel mixtures in primary combustion zone 41 to high hydrogen and CO compositions, that is products of incomplete combustion, with very low hydrocarbon concentrations, thereby reducing the formation of prompt $NO_x$. The turbulent flow also produces complete and homogenous mixing of the incomplete combustion products from primary combustion zone 41 with secondary oxidant in secondary combustion zone 43 at near stoichiometric levels, thereby also reducing reduced peak flame temperatures and the generation of pockets of high $O_2$ concentrations, both of which reduce thermal $NO_x$ formation.

In accordance with one embodiment of the two-stage porous matrix, surface-combustor fluid heating apparatus of this invention, high temperature ceramic particles 36 comprising stationary porous bed 35 are coated with a combustion catalyst. In accordance with another embodiment of this invention, lower fluid-cooled heat exchanger tubes 37 and/or upper fluid-cooled heat exchanger tubes 45 are coated with a combustion catalyst. Coating of high temperature ceramic particles 36 and/or fluid-cooled heat exchanger tubes 37, 45 allows operation of the two-stage porous matrix, surface-combustor fluid heating apparatus at stoichiometric ratios in primary combustion zone 41 less than 0.5, further reducing the $NO_x$ formation in the first stage, and reduces the formation of unburned total hydrocarbons in primary combustion zone 41, thereby reducing $NO_x$ formation in secondary combustion zone 43.

In accordance with yet another embodiment of this invention, a diluent such as recirculated flue gases nitrogen and/or steam, is injected into primary combustion zone 41 and/or recirculated flue gases, excess air, nitrogen, and/or steam are injected into secondary combustion zone 43 to further reduce the peak flame temperatures in these zones. The diluent can be injected by mixing with the primary fuel/oxidant mixture and/or with the secondary oxidant.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for combustion of a gaseous fuel comprising:

introducing a fuel-rich fuel/oxidant mixture into an inlet end of a combustion chamber having a stationary porous bed;

burning said fuel-rich fuel/oxidant mixture within said stationary porous bed, forming a primary combustion zone within said stationary porous bed;

introducing a secondary oxidant into said stationary porous bed downstream of said primary combustion zone, forming a secondary combustion zone; and removing heat resulting from said combustion from said combustion chamber.

2. A process in accordance with claim 1, wherein said fuel is natural gas.

3. A process in accordance with claim 1, wherein said fuel/oxidant mixture has a stoichiometric ratio in the range of about 0.5 and about 1.0.

4. A process in accordance with claim 1, wherein said oxidant is selected from the group consisting of air, oxygen, and oxygen-enriched air.

5. A process in accordance with claim 1, wherein the amount of secondary oxidant introduced into said stationary porous bed is at least sufficient to complete combustion of incomplete combustion products from said primary combustion zone.

6. A process in accordance with claim 1, wherein a diluent is introduced into at least one of said primary combustion zone and said secondary combustion zone.

7. A process in accordance with claim 6, wherein said diluent is selected from the group consisting of recirculated flue gases, excess air, nitrogen, steam and mixtures thereof.

8. A porous matrix, surface combustor-fluid heating apparatus comprising:

at least one combustor chamber wall forming a combustion chamber, said combustion chamber having an inlet end and an outlet end;

a flow distributor proximate said inlet end of said combustion chamber;

a stationary porous bed disposed between said flow distributor and said outlet end;

porous bed heat exchanger means embedded in said stationary porous bed;

fuel/oxidant mixture means for introducing a mixture of a fuel and a primary oxidant into said stationary porous bed; and secondary oxidant means for introducing a secondary oxidant into said stationary porous bed.

9. A porous matrix, surface-combustor fluid heating apparatus in accordance with claim 8, wherein said flow distributor is cooled.

10. A porous matrix, surface-combustor fluid heating apparatus in accordance with claim 8, wherein said stationary porous bed comprises a plurality of high-temperature ceramic particles.

11. A porous matrix, surface-combustor fluid heating apparatus in accordance with claim 8, wherein said flow distributor comprises a wall member having a plurality of openings through which said mixture of said fuel and said primary oxidant flows into said stationary porous bed.

12. A porous matrix, surface-combustor fluid heating apparatus in accordance with claim 8, wherein said secondary oxidant means comprises at least one secondary oxidant injection tube disposed within said stationary porous bed downstream of said fuel/oxidant mixture means.

13. A porous matrix, surface-combustor fluid heating apparatus in accordance with claim 8, wherein said porous bed heat exchanger means comprises at least one fluid-cooled heat exchanger tube disposed in said stationary porous bed.

14. A porous matrix, surface-combustor fluid heating apparatus in accordance with claim 13, wherein the outside diameter of said at least one fluid-cooled heat exchanger tube is in the range of about 0.5 inches and about 3.0 inches.

15. A porous matrix, surface-combustor fluid heating apparatus in accordance with claim 14, wherein said at least one fluid-cooled heat exchanger tube is disposed at least about 1.0 inch to about 4.0 inches from said flow distributor.

16. A porous matrix, surface-combustor fluid heating apparatus in accordance with claim 10, wherein said plurality of high-temperature ceramic particles have a mean diameter in the range of about 0.1 inches and about 3.0 inches.

17. A porous matrix, surface-combustor fluid heating apparatus in accordance with claim 10, wherein said plurality of high-temperature ceramic particles are selected from the group consisting of alumina, silicon carbide, silica, zirconia and mixtures thereof.

18. A porous matrix, surface-combustor fluid heating apparatus in accordance with claim 10, wherein said plurality of high-temperature ceramic particles are coated with a combustion catalyst.

19. A porous matrix, surface-combustor fluid heating apparatus in accordance with claim 13, wherein an exterior surface of said at least one fluid-cooled heat exchanger tube is coated with a combustion catalyst.

20. A porous matrix, surface-combustor fluid heating apparatus in accordance with claim 8 further comprising means for introducing a diluent into said stationary porous bed.

* * * * *